No. 877,966. PATENTED FEB. 4, 1908.
G. E. SWANSON.
SEEDER.
APPLICATION FILED DEC. 19, 1906.
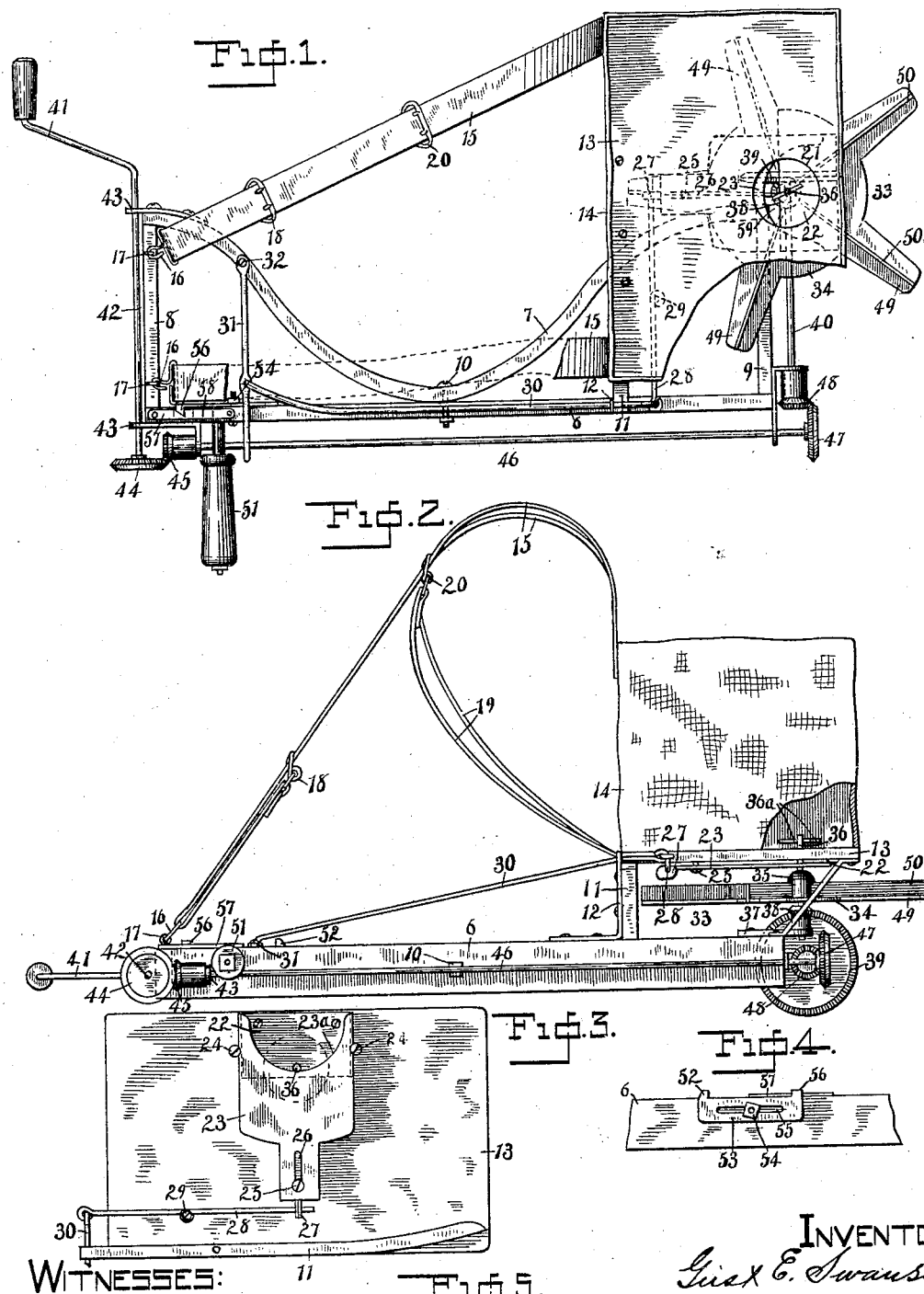
WITNESSES:
INVENTOR
Gust E. Swanson
BY
ATTY.

UNITED STATES PATENT OFFICE.

GUST E. SWANSON, OF LAPORTE, INDIANA.

SEEDER.

No. 877,966.　　　Specification of Letters Patent.　　　Patented Feb. 4, 1908.

Application filed December 19, 1906. Serial No. 348,640.

*To all whom it may concern:*

Be it known that I, GUST E. SWANSON, citizen of the United States, residing at Laporte, in the county of Laporte and State of Indiana, have invented certain new and useful Improvements in Seeders, of which the following is a specification.

My invention relates to agricultural implements and refers especially to seeding machines and more particularly to that class of manually operated devices which are designed to scatter seed broadcast.

The chief objects of my invention are to provide a portable, easily operated and efficient seed sowing apparatus; to furnish means for securing the appliance to the person of the user in a convenient manner; to improve the feeding mechanism and bring it completely under the control of the operator; to provide a distributing device that will scatter the seed uniformly over a considerable area; to design a light framework and mechanism so that the apparatus will impose as little burden as possible in addition to the weight of the grain or seed, and to simplify the entire appliance so that it can be manufactured economically.

I accomplish the above and other minor results by means of the apparatus illustrated in the accompanying drawing and in which—

Figure 1 is a plan view of my improved device for sowing seed broadcast; Fig. 2 is a side view of the complete machine; Fig. 3 is a fragmentary view showing the under side of the bottom of the seed receptacle; Fig. 4 is a detail view showing the method of adjusting the index for the feed controlling mechanism, and Fig. 5 is a rear view of the bottom of the seed receptacle.

Referring to the drawing the sides of the frame are formed of a straight bar 6 and a curved member 7 joined at the ends by connecting pieces 8, 9. The curved member 7 has a concavity adapted to engage the side of the body of the operator and is joined to the side bar 6 by a bolt 10. The said bar and curved member 7 are connected near the rear ends by a transverse member 11, strengthened by an angle piece 12. Upon this transverse part rests a board or base 13 which forms the bottom of a seed receptacle 14. The sides of the receptacle are preferably formed of canvas or similar material and secured thereto are shoulder straps 15 provided with hooks 16 at their free extremities which engage rings or loops 17 fixed to the front end piece 8. The straps 15 are adjustable in length by the buckles 18. Auxiliary straps 19, are adjustably secured to the shoulder straps by buckles 20. The bottom 13 of the seed receptacle is furnished with an aperture 21 which is partially covered on the under side by a fixed plate 22. Beneath this plate is a slide 23 having a curved margin $23^a$ and secured in position by flat headed screws 24 which overlap the margins of the slide, while a shouldered screw 25 engages a slot 26, the ends of which form stops to limit the movement of the slide. A lug 27 formed integral with the slide is pierced for the reception of one end of a lever 28, pivoted at 29, its other end being connected by a link rod 30 to a hand lever 31 attached to the curved member 7 at 32.

Below the aperture 21 in the seed receptacle is mounted a seed distributer 33 in the form of a circular disk 34 attached to a hub 35 mounted upon a vertical shaft 36 the upper end of which is journaled in the plate 22 and projects somewhat above the said plate where it is provided with transverse arms $36^a$ which have the function of an agitator to prevent the seed from clogging above the aperture. The lower end of the shaft 36 is journaled in a bracket 37 attached to the frame, and carries a beveled pinion 38 which meshes with a larger beveled gear 39 mounted on a shaft 40 supported on the end piece 9. An operating crank 41 attached to a shaft 42 mounted in bearings 43 transmits motion through gears 44, 45, countershaft 46 and gears 47, 48, to the shaft 40. The relative pitch of the gears being such as to give a relatively high rate of speed to the distribution 33. The disk 34 is provided with radiating arms 49. To the median line of each arm is fixed a radiating flange 50 which extends from the hub 35 to the extremities of said arms. A handle 51 is firmly fixed to the frame at any convenient point and serves to aid in steadying the apparatus when grasped by the left hand of the operator. The lever 31 which controls the position of the feed slide 23 is held against a stop 52 formed integral with a plate 53 which is adjustably secured to the inner face of the side bar 6 by a bolt 54 which engages a slot 55 in said plate and then passes through the frame piece. A part of said plate is turned over to form an index 56 which rests upon a scale 57 furnished with indicating marks or graduations 58 which enable the operator to readily determine the degree of the opening 59 between the plates 22 and 23, through which the seed is fed to the distributer. The bottom 13 of the receptacle is formed with a double incline as shown in Fig. 5 so that the inner surface slopes toward the aperture 21 and assists in bringing the seed to that point and is especially useful for this purpose when there is only a small quantity in the receptacle.

The method of operating my appliance is as follows:—A sufficient quantity of seed having been placed in the receptacle the operator straps the implement on his side at a convenient height to enable him to readily turn the crank with his right hand, the receptacle and distributer being directly behind his back. Having set the index 56 at the graduation which will indicate the proper opening for the particular variety of seed to be planted which has previously been determined by trial, the operator walks across the field at the same time turning the crank with a uniform motion. The sower thus avoids trampling upon that portion of the field which has been sown and by gaging his excursions back and forth across the field by the width of the tract covered by the scattered seed the result will be satisfactory. As the seed falls upon the center plate of the distributer while it is rotated at a high speed the centrifugal force will cause the seed to travel along the angles formed between the vertical flanges and the horizontal plate until the extremities of the arms are reached when the momentum acquired will project the seed to a considerable distance. The extent of this distribution may be increased or diminished by varying the speed of the distributer and also by adjusting the opening 59 between the plates.

It is evident that many changes may be made in the devices of my invention as herein disclosed without departing from the spirit and scope thereof and I do not wish, therefore, to be limited to the precise construction set forth.

Having thus described my invention what I claim as new and desire to secure by Letters Patent, is:—

1. In a hand seeding machine, the combination of a supporting frame adapted to be attached to the side of the operator, a seed receptacle arranged upon the rear of said frame, means for agitating the seed within the receptacle, and seed distributing mechanism.

2. In a hand seeding machine, the combination with a seed receptacle provided with distributing mechanism, of a seed agitator arranged in said receptacle, a supporting frame adapted to be attached to the side of the operator, and a plurality of straps adapted to engage the shoulders.

3. In a hand seeding machine, the combination with a receptacle, and seed distributing mechanism, of means for agitating the seed within said receptacle, a supporting frame adapted to engage the side of the operator, a plurality of adjustable straps adapted to engage the operator's shoulders, and a handle fixed to said frame.

4. In a seeding machine, the combination with a receptacle and a seed distributing mechanism, of means for agitating the seed within said receptacle, a framework adapted to engage the side of the operator, a plurality of straps adapted to engage the shoulders of the operator, auxiliary straps adapted to pass beneath the arms, a handle fixed to said frame and means for operating said distributing mechanism.

5. In a hand seeding machine, the combination with a receptacle provided with seed distributing mechanism, of a support consisting of a frame forming three sides of a rectangle, and an auxiliary member forming a brace for the frame, said brace being curved to conform to the side of the operator, and means for securely attaching said frame to the body of the user.

6. In a hand seeding machine, the combination with a seed receptacle and a seed distributing mechanism, of a rectangular frame, provided with a curved brace adapted to engage the side of the user, an operating shaft journaled upon said frame, a counter shaft mounted parallel to said operating shaft, means operatively connecting said shafts, and means for suspending the frame upon the body of the user.

7. In a hand seeding machine, the combination with a receptacle provided with seed distributing mechanism, of a substantially rectangular frame work adapted to engage the side of the operator, a driving shaft journaled upon said frame, a counter-shaft having geared connection with said driving shaft, a plurality of adjustable straps adapted to engage the shoulders of the operator for the purpose of suspending said frame, adjustable auxiliary straps adapted to pass beneath the arm-pits, an operating handle, a fixed handle for supporting the frame, and a scale provided with an adjustable index for indicating the size of the aperture in the dropping plate.

In testimony whereof I affix my signature in presence of two witnesses.

GUST E. SWANSON.

Witnesses:
HENRY KESSLER,
M. E. LELITER.